United States Patent [19]

Pantermuehl et al.

[11] Patent Number: 4,762,543
[45] Date of Patent: Aug. 9, 1988

[54] CARBON DIOXIDE RECOVERY

[75] Inventors: Leroy A. Pantermuehl, Katy; Thomas E. Krisa, Houston, both of Tex.

[73] Assignee: Amoco Corporation, Chicago, Ill.

[21] Appl. No.: 27,761

[22] Filed: Mar. 19, 1987

[51] Int. Cl.[4] .................................................. F25J 3/02
[52] U.S. Cl. .......................................... 62/28; 62/30; 62/41
[58] Field of Search ...................... 62/9, 11, 16, 17, 20, 62/23, 24, 27–29, 30, 32, 41, 42, 44

[56] References Cited

U.S. PATENT DOCUMENTS

| | | | |
|---|---|---|---|
| 3,282,060 | 11/1966 | Hays | 62/24 |
| 4,149,864 | 4/1979 | Eakman et al. | 62/11 |
| 4,252,548 | 2/1981 | Markbreiter et al. | 62/23 X |
| 4,293,322 | 10/1981 | Ryan et al. | 62/17 |
| 4,318,723 | 3/1982 | Holmes et al. | 62/24 X |
| 4,383,842 | 5/1983 | O'Brien | 62/20 |
| 4,428,759 | 1/1984 | Ryan et al. | 62/17 |
| 4,441,900 | 4/1984 | Swallow | 62/29 |
| 4,547,209 | 10/1985 | Netzer | 62/28 X |
| 4,595,404 | 6/1986 | Ozero et al. | 62/24 X |

Primary Examiner—Steven E. Warner
Attorney, Agent, or Firm—L. Wayne White

[57] ABSTRACT

A novel gas processing method is disclosed which is useful in separating and recovering carbon dioxide from gas streams having a high carbon dioxide content (e.g., 85–95 mol percent) and a low hydrocarbon/nitrogen content. The method is particularly useful in processing gas streams produced during carbon dioxide flooding operations for enhanced oil recovery.

2 Claims, 1 Drawing Sheet

CARBON DIOXIDE RECOVERY

BACKGROUND OF THE INVENTION

1. Field of the Invention:

This invention is a gas processing method for separating and recovering carbon dioxide (CO2) from gas streams having a high carbon dioxide content (e.g., 85-95 mol percent) and a low methane and/or nitrogen content. The novel process is particularly useful in processing gas streams produced during CO2 flooding operations for enhanced oil recovery.

2. Technology Review:

Various reservoir flooding techniques have been utilized by the oil and gas industry in enhanced oil recovery programs as a means to increase the production of hydrocarbons.

Carbon dioxide flooding is one technique that has been effectively used in the past, and is likely to become increasingly important in the future. In such operations, carbon dioxide is pumped into the reservoir through an injection well for extended periods of time (e.g., years). The injected carbon dioxide "floods" the treated zone and forces/carries the oil in the formation toward one or more production wells where the fluids are recovered. The composition of the produced fluids changes with time and, at some point, carbon dioxide "breakthrough" will occur. After breakthrough the volume of gas and the carbon dioxide content of the produced fluids increase substantially. Carbon dioxide may represent 60-96 mol percent (or more) of the fluids produced. In order for carbon dioxide flooding operations to be economically viable, carbon dioxide must be efficiently recovered from the produced fluids for reuse. In many cases, recovered carbon dioxide can be reinjected into the formation through the injection well, provided chemical specifications for purity are met. Product specifications for carbon dioxide can be quite high, particularly with respect to the content of hydrocarbons (i.e., methane and ethane) and/or nitrogen.

Various gas processing methods have been used to separate and recover carbon dioxide as well as the hydrocarbon/nitrogen components from gas streams having a high carbon dioxide content. The method (and equipment) chosen has depended, at least in part, on the product specifications for the carbon dioxide product.

Generally, where product specifications are high, current technology separates nitrogen and methane from carbon dioxide in one of three general ways:

(1) preferential passage of carbon dioxide through a semi-permeable (differentially permeable) membrane;

(2) absorption of carbon dioxide by a chemical or physical solvent, followed by regeneration of the solvent; and (3) distillative or extractive distillative processes. The latter type of process is illustrated, for example, by the so-called "Ryan/Holmes" technology. Further information on the Ryan/Holmes technology is found in the paper presented under the title "The Ryan/Holmes Technology and Economical Route for CO2 and Liquids Recovery," presented by Ryan et al. at the AIChE winter meeting in Atlanta, Georgia on Mar. 11-14, 1984. Reference is also made to U.S. Pat. Nos. 4,293,322, 4,318,723, 4,383,842 and 4,428,759 which relate to one or more aspects of the Ryan/Holmes technique.

SUMMARY OF THE INVENTION

A novel gas processing method has now been discovered for efficiently separating and recovering carbon dioxide in high purity and yield from a gas stream that has a high carbon dioxide content (i.e., from about 85 to about 95 mol percent). The process provides a high quality carbon dioxide product in a pumpable state, while minimizing the size of the fractionation tower required to separate volatile hydrocarbons (especially methane) and/or nitrogen from carbon dioxide. In addition, the present process minimizes the refrigeration/cooling energy required in the overall process. Finally, the process utilizes a so-called "stripper tower" concept, which optimizes the energy consumption of the tower. Other economic and procedural advantages of the present will be apparent to those skilled in the art.

In accordance with one aspect of the invention, a pressurized gaseous feed stream comprising methane and/or nitrogen and from about 85 to about 95 mol percent carbon dioxide is chilled to a temperature effective to cause at least a portion of the carbon dioxide to condense to a liquid. The chilled stream is then introduced into a "separator" vessel wherein said chilled stream is separated into a first liquid bottom fraction (consisting essentially of carbon dioxide) and a first vapor fraction (comprising carbon dioxide, volatile hydrocarbons and/or nitrogen). The first vapor fraction is introduced into the bottom portion of a distillation column. The distillation column is operated under conditions effective for removing overhead a second vapor fraction comprising carbon dioxide and all or substantially all of the volatile hydrocarbons (e.g., methane) and/or nitrogen present in the fluid feed stream, and for producing a second bottom fraction consisting essentially of liquid carbon dioxide. The first and second bottom fractions are high purity, pumpable carbon dioxide streams which can be combined and recovered for reuse (e.g., for reinjection into the reservoir). The second vapor fraction is processed further by cooling the vapor fraction to a temperature effective to cause at least a portion of the carbon dioxide in said vapor fraction to condense to a liquid and then introducing the cooled vapor fraction into a reflux accumulator vessel where the cooled vapor fraction is separated into (a) a third liquid bottom fraction (consisting essentially of carbon dioxide) which is recovered and reintroduced into the top portion of said stripper tower, and (b) a third vapor fraction (comprising methane and/or nitrogen and carbon dioxide) which is discharged or recovered (e.g., for use as a fuel gas).

In the above process, the separation vessel can be replaced with a distillation column or other equivalent means for separating at least a portion of the condensed carbon dioxide from the pressurized feed stream.

DETAILED DESCRIPTION OF THE INVENTION

Figure 1:
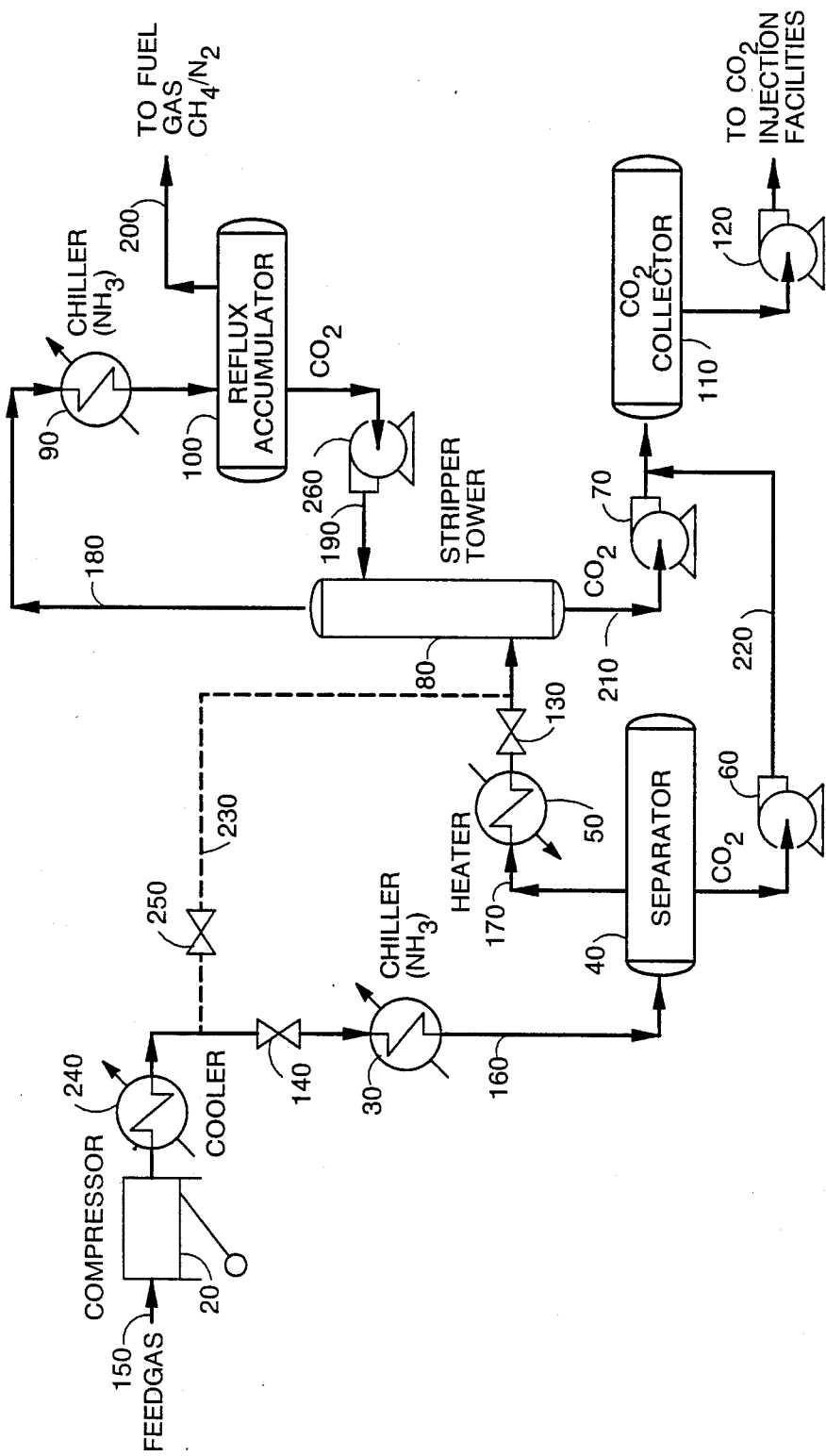
FIG. 1 shows schematically the apparatus configured to practice the process.

The process is illustrated by reference to FIG. 1. There, it is seen that the feed gas containing carbon dioxide is fed through line (150) into a compressor (20), a cooler (240) and a chiller (30), and the pressurized gas is then fed through line (160) into the separator (40). The cooler (240) normally uses air or water as the coolant and the chillers normally use ammonia or propane as the refrigerant, but such materials can be varied. Conditions in the separator are such that at least a portion of the carbon dioxide in the feed stream condenses to a liquid and is withdrawn as a high purity product from the bottom of the separator. The remaining portion of the feed stream is taken overhead as a vapor from separator (40) through line (170) into a heater (50), and the heated vapor is then introduced into the bottom portion of the distillation column (i.e., stripper tower) (80) below the bottom tray. The gas entering the stripper tower normally has a carbon dioxide content of about 60–75 mol percent and is introduced into the tower at a temperature of about 60°–80° F. and a pressure of about 800–900 psig. Under these conditions, a stripper tower with dimensions of 4 ft (inside diameter) by 42 ft (seam to seam) is effective in stripping gaseous hydrocarbons (e.g., methane) and/or nitrogen along with some carbon dioxide away from condensed carbon dioxide.

The high purity liquid carbon dioxide streams withdrawn from the bottom of separator (40) and the bottom of stripper tower (80) are pressurized by pumps (60) and (70), combined and accumulated in collector (110). Liquid carbon dioxide can be withdrawn from collector (110), pressurized by pump (120) and conveyed by appropriate conduits to a carbon dioxide facility. The temperature in the stripper tower normally varies from about 55°–65° F. at the bottom tray to about 40°–50° F. at the top tray. The temperature of the reflux in the reflux accumulator is about 0°–10° F.

The gaseous stream taken overhead from the stripper tower is conveyed through line (180) into a chiller (90) and into a reflux accumulator. A liquid stream that is predominantly carbon dioxide is condensed in the reflux accumulator, withdrawn and fed back into the top portion of the stripper tower through line (190). The remainder of the material entering the reflux condenser is taken overhead from the reflux accumulator and can be discharged, but is preferably used as a fuel gas or further treated for sale as a natural gas.

The plant design illustrated by FIG. 1 is quite flexible and can handle feed gases having different amounts of carbon dioxide. For example, in the event that the carbon dioxide content in the feed gas flowing through line (150) falls below about 85 mol percent, the chiller (30), separator (40) and heater (50) can be bypassed and the feed gas introduced directly into the bottom of the stripper tower. This bypass is illustrated by dashed line (230).

In the event that the carbon dioxide content in line (150) is greater than about 95 mol percent, generally a pumpable liquid carbon dioxide stream of adequate purity (i.e., greater than 96 mol percent) can be obtained directly from the separator (40) without further processing. In this instance, the gas stream from the separator (comprising volatile hydrocarbons, nitrogen and carbon dioxide) can be discharged or recovered.

Math modeling operations were conducted on the plant design illustrated by FIG. 1 using DESIGN II software from ChemShare Corporation. The data from such operations indicate that high efficiencies and excellent product recovery of high quality carbon dioxide are obtained from feed streams of various carbon dioxide content within the stated range.

What is claimed is:

1. A gas processing method for separating and recovering carbon dioxide from a pressurized gaseous feed stream comprising methane and/or nitrogen and at least about 85 mol percent carbon dioxide, said method comprising:
    (a) cooling said feed stream to a temperature effective to cause at least a portion of the carbon dioxide in said feed stream to condense to a liquid;
    (b) introducing the cooled, pressurized feed stream from step (a) into a separator vessel wherein said stream is separated into a first liquid bottom fraction (consisting essentially of carbon dioxide) and a first vapor fraction (comprising methane and/or nitrogen and carbon dioxide);
    (c) recovering said first liquid bottom fraction;
    (d) taking said first vapor fraction as a first overhead gas stream from said separator vessel and conveying said first overhead gas stream to a stripper tower and introducing said overhead gas stream into the bottom portion of said stripper tower;
    (e) passing said first overhead gas stream upwardly through said stripper tower under conditions effective to separate said stream into a second liquid bottom fraction (consisting essentially of carbon dioxide) and a second vapor fraction (comprising methane and/or nitrogen and carbon dioxide);
    (f) recovering said second liquid fraction;
    (g) taking said second vapor fraction as a second overhead gas stream from said stripper tower;
    (h) cooling said second vapor fraction to a temperature effective to cause at least a portion of the carbon dioxide in said second vapor fraction to condense to a liquid; and
    (i) introducing the cooled second vapor fraction from (h) into a reflux accumulator vessel wherein said cooled vapor fraction is separated into (a) a third liquid bottom fraction (consisting essentially of carbon dioxide) which is recovered and reintroduced into the top portion of said stripper tower; and (b) a third vapor fraction (comprising methane and/or nitrogen and carbon dioxide) which is discharged or recovered.

2. The method defined by claim 1 wherein said first and second liquid fractions are combined, pressurized and reinjected into a subterranean formation through an injection well to promote carbon dioxide flooding of said subterranean formation.

* * * * *